United States Patent [19]

Nakano

[11] Patent Number: 5,027,668
[45] Date of Patent: Jul. 2, 1991

[54] LOADING CAM MECHANISM FOR TOROIDAL TYPE CONTINUOUSLY VARIABLE TRANSMISSION

[75] Inventor: Masaki Nakano, Kawasaki, Japan

[73] Assignee: Nissan Motor Co., Ltd., Yokohama, Japan

[21] Appl. No.: 476,580

[22] Filed: Feb. 7, 1990

[30] Foreign Application Priority Data

Mar. 31, 1989 [JP] Japan .................................. 1-82423

[51] Int. Cl.$^5$ ......................................... F16H 15/08
[52] U.S. Cl. .................................... 74/200; 184/6.12
[58] Field of Search ............... 74/200; 184/6.12, 11.1, 184/11.4

[56] References Cited

U.S. PATENT DOCUMENTS 4,893,517  1/1990  Nakano .................................. 74/200

FOREIGN PATENT DOCUMENTS 61-27359  2/1986  Japan .................................. 74/200
63-106456  5/1988  Japan .

Primary Examiner—Allan D. Herrmann
Assistant Examiner—David W. Laub
Attorney, Agent, or Firm—Foley & Lardner

[57] ABSTRACT

In a toroidal type continuously variable transmission having a center shaft, input and output discs mounted on the center shaft, friction rollers confined in a toroidal cavity formed between the input and output discs, and a loading cam mechanism for applying an axial thrust load on the input disc in accordance with an input torque, there is provided an annular oil receiving member which forms an annular oil reservoir around the center shaft for collecting a lubricating oil discharged from a hole of the center shaft, and storing the oil so as to immerse cam rollers and/or a thrust bearing of the loading cam mechanism.

17 Claims, 5 Drawing Sheets

LOADING CAM MECHANISM FOR TOROIDAL TYPE CONTINUOUSLY VARIABLE TRANSMISSION

REFERENCES TO RELATED U.S. APPLICATIONS

The following, commonly assigned, U.S. patent applications relate to subject matter similar to that of the present application. (1) application Ser. No. 07/313,418; filed Feb. 22, 1989. (2) application Ser. No. 07/314,846; filed Feb. 24, 1989. (3) application Ser. No. 07/316,944; filed Feb. 28, 1989. (4) application Ser. No. 07/352,309; filed May 16, 1989. (5) application Ser. No. 07/357,192; filed May 26, 1989. (6) application Ser. No. (unknown), based on Japanese Patent Application No. 63-318104 (Our ref. U151-89). (7) application Ser. No. (unknown), based on Japanese Patent Application No. 63-318106 (Our ref. U152-89). (8) application Ser. No. (unknown), based on Japanese Patent Application No. 63-318107 (Our ref. U153-89).

BACKGROUND OF THE INVENTION

The present invention relates to a toroidal type continuously variable transmission (CVT), and more specifically to a loading cam mechanism for producing an axial thrust load in accordance with an input torque.

Japanese Patent Provisional (Kokai) Publication No. 63-106456 shows a conventional example. A toroidal type transmission of this example has a center transmission shaft, input and output discs which are mounted on the center shaft and which form a toroidal cavity therebetween, and friction rollers which are installed in the toroidal cavity for transmitting torque between the input and output discs, and which are inclined to continuously vary a transmission ratio. In order to prevent slippage of the friction rollers, there is further provided a loading cam mechanism for producing an axial thrust load in accordance with an input torque, and applying the axial thrust load on one of the input and output discs so as to push one toward the other.

As shown in FIG. 5, the loading cam mechanism 1 of this conventional example includes a drive plate 3 mounted on the center transmission shaft 2 at the side of the input disc 4, and cam rollers 5 confined between cam surfaces 3a and 4a of the drive plate 3 and the input disc 4. The drive plate 3 is splined to the center shaft 2, and an axial movement of the drive plate 3 is limited by an outward flange of the center shaft 2. When the input torque is varied, the drive plate 3 and the input disc 4 rotate relative to each other, and the cam rollers 5 roll on the cam surfaces 3a and 4a and varies the axial thrust load applied on the input disc 4 by varying the axial distance between the drive plate 3 and the input disc 4.

The drive plate 3 is formed with at least one radial oil hole 6 for carrying a lubricating oil discharged from a radial hole 7 of the center shaft 2, to the cam rollers 5. The lubrication of the cam rollers is very important in order to ensure the smooth and accurate operation of the cam mechanism.

In this conventional loading cam mechanism 1, however, the lubrication is not satisfactory. Each cam roller 5 is rotatable relative to the drive plate 3. Therefore, the oil hole 6 is not always held at a position appropriate to direct the oil to the cam roller 5, and the lubrication becomes insufficient when the oil hole turns aside from the cam roller 5. The shortage of the lubricating oil causes wear and seizure in the cam rollers 5 and the cam surfaces 3a and 4a.

SUMMARY OF THE INVENTION

It is therefore an object of the present invention to provide a loading cam mechanism for a toroidal type continuously variable transmission which is capable of ensuring the sufficient lubrication of the loading cam mechanism with a simple construction.

According to the present invention, a toroidal type continuously variable transmission comprises a center transmission shaft, a drive means, and a loading means. The drive means comprises input and output discs mounted on the center shaft, and a friction roller means interposed between the input and output discs for transmitting torque from the input disc to the output disc. The loading means is a means for applying an axial thrust load to the drive means in accordance with an input torque inputted to the drive means. The loading means comprises a thrust supporting means for sustaining a thrust load, and a lubricant receiving means for forming a reservoir for storing a lubricant so as to immerse the thrust supporting means in the lubricant stored in the reservoir.

In illustrated embodiments of the invention, the thrust supporting means comprises either or both of cam rollers 44 and a thrust bearing 72 of the loading cam mechanism constituting the loading means, and the lubricant receiving means comprises at least one of an oil receiving member 64 shown in FIG. 1, an oil receiving member 110 shown in FIGS. 2 and 4, and an oil receiving member 120 shown in FIG. 4.

DETAILED DESCRIPTION OF THE INVENTION

Figure 1:
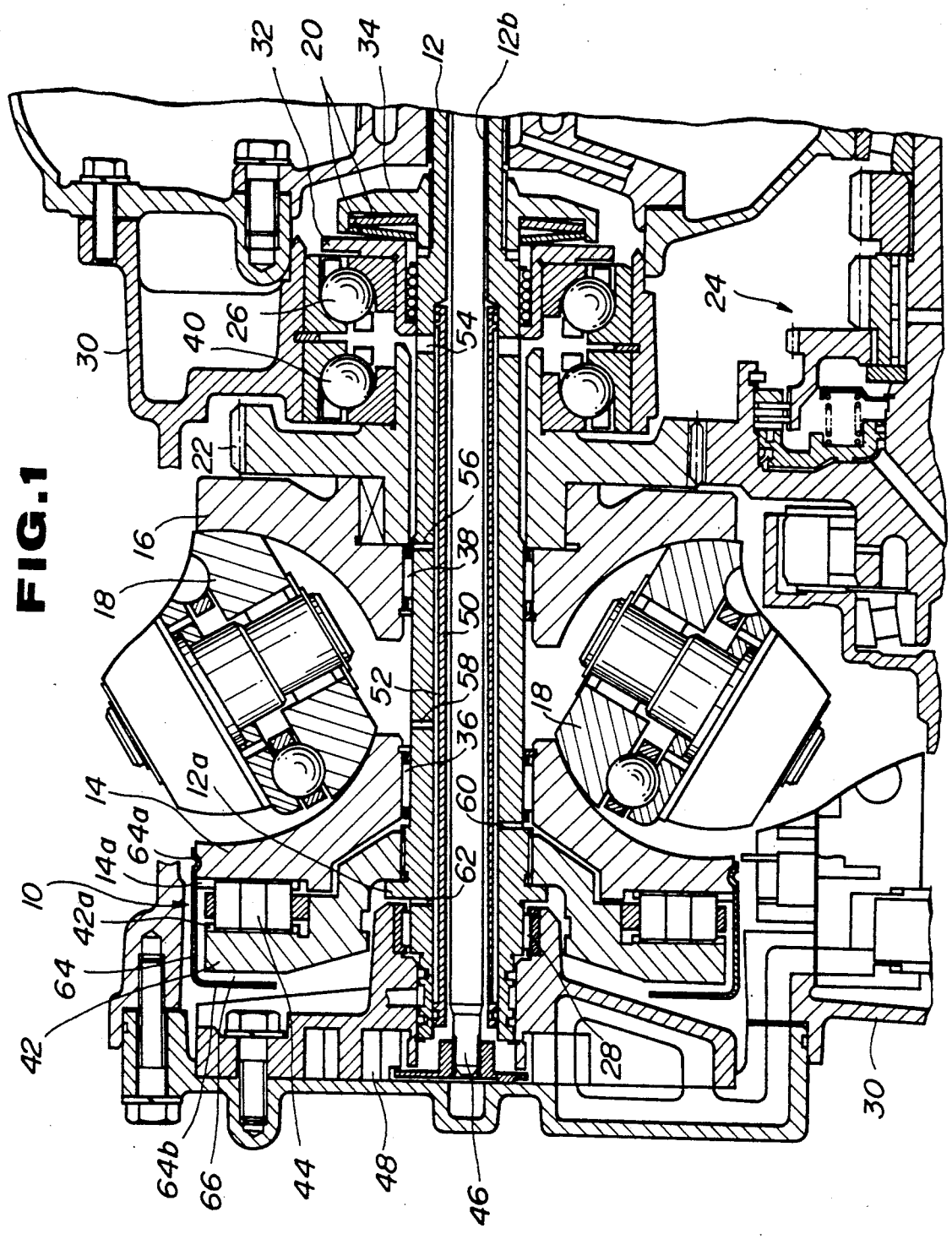
FIG. 1 is a sectional view of a toroidal type continuously variable transmission according to a first embodiment of the invention.

FIG. 1 shows a first embodiment of the present invention among three illustrated embodiments.

A toroidal type continuously variable transmission T of the first embodiment includes a toroidal type drive mechanism (or drive means) H and a loading cam mechanism 10 (or loading means), and a center transmission shaft 12. In this embodiment, an engine (not shown) of a vehicle is disposed on the right side of the transmission as viewed in FIG. 1, and power of the engine is inputted to the center transmission shaft 12 through a torque converter. The center transmission shaft 12 of the first embodiment serves as a torque input shaft.

The toroidal drive mechanism H includes an input disc 14, an output disc 16, and an intervening friction member (or friction roller means) which, in this embodiment, consists of two friction rollers 18. The input and output discs 14 and 16 are both mounted on the center transmission shaft in axially spaced relation with each other. The input and output discs 14 and 16 have confronting toroidal surfaces, and form a toroidal cavity therebetween.

The friction rollers 18 are installed in the toroidal cavity between the input and output discs 14 and 16, and in frictional contact with each of the input and output discs 14 and 16. The toroidal drive mechanism H is capable of continuously vary a transmission ratio which is a ratio between a rotational speed of the output disc 16 and a rotational speed of the input disc 14, by inclining the power rollers 18, and varying contact points among the input and output discs and the power rollers 18. The two friction power rollers 18 are arranged symmetrically with respect to the axis of the center transmission shaft 12, and inclined in opposite directions.

The input disc 14 receives an axial preload produced by a disc spring (Belleville spring) 20, and an axial thrust load produced by the loading cam mechanism 10. At the same time, torque is inputted from the center transmission shaft 12 through the loading cam mechanism 10 into the input disc 14. The power rollers 18 transmit the torque from the input disc 14 to the output disc 16 while varying the transmission ratio continuously.

The output disc 16 is coupled to an output gear 22 so that the output disc 16 and the output gear 22 rotate together. The output torque of the output disc 16 is transmitted through the output gear 22 to a forward-reverse changeover mechanism 24 for changing the direction of rotation between a forward rotational direction and an opposite reverse rotational direction. The forward or reverse output rotation of the forward-reverse changeover mechanism 24 is further transmitted to drive wheels of the vehicle through an appropriate drive line.

The center transmission shaft 12 is rotatably supported by a transmission casing 30 through a ball bearing 26 and a needle bearing 28.

The preloading disc spring 20 is interposed between a spacer 32 and a loading nut 34. The spacer 32 is provided between the ball bearing 26 and the center transmission shaft 12. The loading nut 34 is screwed on the center transmission shaft 12. The disc spring 20 applies a biasing force through the loading nut 34 to the center transmission 12, and by so doing pushes the center transmission shaft 12 rightwardly as viewed in FIG. 1. This pushing force is transmitted through the center transmission shaft 12 and the loading cam mechanism 10, and applied on the input disc 14, as the axial preload for pushing the input disc 14 toward the output disc 16.

The input and output discs 14 and 16 are rotatably mounted on the center transmission shaft 12 through needle bearings 36 and 38, respectively. The input disc 14 of the first embodiment is rotatable relative to the center transmission shaft 12. The loading cam mechanism 10 is provided between the input disc 14 and the center transmission shaft 12. The output gear 22 is supported by the transmission casing 30 through a ball bearing 40 in such a manner that the output gear 22 is rotatable, but axially immovable.

The loading cam mechanism 10 includes a drive plate 42, and one or more cam rollers 44. The drive plate 42 is mounted on, and splined to, the center transmission shaft 12. The drive plate 42 has a cam surface 42a facing toward the input disc 14, and the input disc 14 has a cam surface 14a facing toward the drive plate 42. The cam rollers 44 are compressed between the cam surfaces 42a and 14a of the drive plate 42 and the input disc 14. The center transmission shaft 12 is formed with an outward flange 12a, which abuts against the drive plate 42, and limits the leftward axial movement of the drive plate 42.

The loading cam mechanism 10 transmits torque from the center transmission shaft 12 to the input disc 14 through the cam rollers 44. When the input torque varies, the drive plate 42 and the input disc 14 rotate relative to each other, and the cam rollers 44 roll on the inclined cam surfaces 42a and 14a, and vary the axial distance between the drive plate 42 and the input disc 14. Thus, the cam mechanism 10 applies an axial thrust load for pushing the input disc 14 toward the output disc 16, and varies the magnitude of the thrust load by varying the axial distance between the drive plate 42 and the input disc 14. When the input torque increases, the cam rollers 44 wedges into a narrower space between the cam surfaces 42a and 14a in such a direction as to separate the drive plate 42 and the input disc 14 wider apart from each other, and increases the axial thrust load to prevent slippage of the friction rollers 18.

The center transmission shaft 12 is a hollow shaft, and has a bore 12b in which a pump shaft 46 is inserted. The pump shaft 46 is driven by the engine, and drives an oil pump 48 which is provided at the end of the center transmission shaft 12. A sleeve 50 is provided over the pump shaft 46 within the bore 12b of the center transmission shaft 12. The oil pump 48 is arranged to discharge a lubricating oil into an oil passage 52 formed between the outside surface of the sleeve 50 and the inside surface of the bore 12b of the center transmission shaft 12.

The center transmission shaft 12 has at least first, second, third, fourth and fifth radial holes 54, 56, 58, 60 and 62 for supplying the lubricating oil in the oil passage 52, to various parts of the transmission. The first radial hole 54 supplies the oil to the bearings 26 and 40. The second radial hole 56 leads the lubricant to the needle bearing 38 of the output disc 16. The third radial hole 58 is directed to the friction rollers 18 to lubricate the contact surfaces of the rollers 18. The fourth radial hole 60 carries the lubricant to the needle bearing 36 of the input disc 14, and the loading cam mechanism 10. The fifth radial hole 62 directs the lubricant to the needle bearing 28 supporting the center transmission shaft 12, and the loading cam mechanism 10.

In the first embodiment, the loading cam mechanism 10 has a ring-shaped oil receiving member 64 which has a cylindrical circumferential portion and an inward flange portion 64b. The cylindrical portion has a first end 64a and a second end. The inward flange portion 64b projects from the second end of the cylindrical portion, radially inwardly toward the axis of the cylindrical portion. The first end 64a of the receiving member 64 is fixed to the outer periphery of the input disc 14. In this embodiment, the first end 64a is fixed to the input disc 14 by caulking or staking in a liquid-tight manner. The cylindrical portion of the receiving member 64 axially extends from the first end 64, rightwardly as viewed in FIG. 1, over the drive plate 42, to the second end. The inward flange portion 64b extends from the second end of the cylindrical portion, radially inwardly along the left side surface of the drive plate 42, and terminates at an inward end. The drive plate 42 is interposed between the inward flange portion 64b and the input disc 14, and completely surrounded by the cylindrical portion of the receiving member 64. The inward end of the inward flange portion 64b is located near the radial inner end of the cam rollers 44. The receiving member 64 forms an annular oil reservoir (sump) 66 which opens inwardly, and designed to catch and store the lubricating oil.

The toroidal type continuously variable transmission of this embodiment is operated as follows: A torque of the engine is transmitted through the torque converter to the center transmission shaft 12 of the toroidal transmission, and further transmitted from the center transmission shaft 12, through the loading cam mechanism 10, to the input disc 14. The torque of the input disc 14 is transmitted through the friction rollers 18 to the output disc 16.

When the input torque inputted to the center transmission shaft 12 is increased or decreased to accelerate the vehicle or operate the vehicle in some other way, then the variation of the input torque causes a relative rotation between the drive plate 42 and the input disc 14 due to a torque difference therebetween. During this relative rotation between the drive plate 42 and the input disc 14, the cam rollers 44 roll on the cam surfaces 42a and 14a, and vary the axial thrust load by which the input disc 14 pushes the friction rollers 18 against the output disc 16.

During this, a reaction force of the axial thrust load is applied on the cam rollers 44 by the input disc 14, and the cam rollers 44 are compressed by a heavy thrust pressure between the cam surfaces 42a and 14a. Therefore, the cam rollers 44 require a sufficient amount of the lubricating oil in order to continue a smooth rolling motion.

The lubricating oil supplied from the oil pump 48 gushes out from the oil passage 52, through the radial holes 60 and 62 of the rotating center transmission shaft 12, and scatters radially outwardly by the centrifugal force. The receiving member 64 of the first embodiment catches the lubricating oil ejected from the radial holes 60 and 62 and driven radially outwardly by the centrifugal force, and stores the lubricating oil in the oil reservoir 66. Therefore, the cam rollers 44 are immersed in the lubricating oil held in the oil reservoir 66. The inward flange portion 64b has a sufficient radial length, and the oil reservoir 66 is deep enough to immerse almost the whole of each cam roller 44 in the lubricating oil held in the oil reservoir 66. In this way, the receiving member 64 ensures the satisfactory lubrication of the cam rollers 44. The lubricating oil collected by the receiving member 64 is held in the annular oil reservoir by the centrifugal force without falling down.

Thus, the arrangement of the first embodiment can prevent wear and seizure of the cam rollers 44 and the cam surfaces 42a and 14a by reliably preventing shortage of the lubrication.

Figure 5:
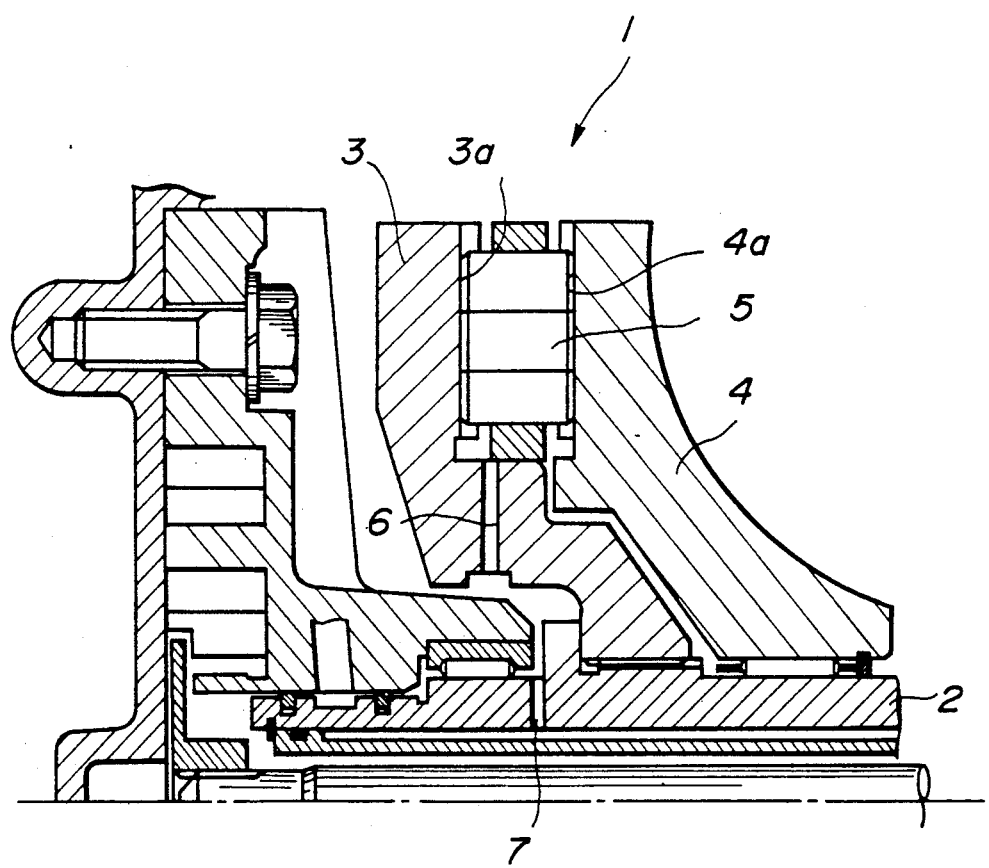
FIG. 5. is a sectional view showing a loading cam mechanism of a conventional example.

In this embodiment, not an oil hole is formed in the drive plate 42, in contrast to the conventional drive plate 3 having the radial oil hole 6 as shown in FIG. 5. The lubricating oil flowing radially outwardly along the left side surface of the drive plate 42 is caught by the oil reservoir 66, so that the drive plate 42 requires no oil hole.

In the first embodiment, the cam rollers 44 serve as a thrust supporting means for sustaining a thrust load, and as a thrust roller means compressed between a first rotating means and a second rotating means. The oil receiving member 64 serves as a lubricant receiving means for storing a lubricant to lubricate the thrust supporting means. The drive plate 42 and the center shaft 12 serve as the first rotating means, and the input disc 14 serves as the second rotating means.

Figure 2:
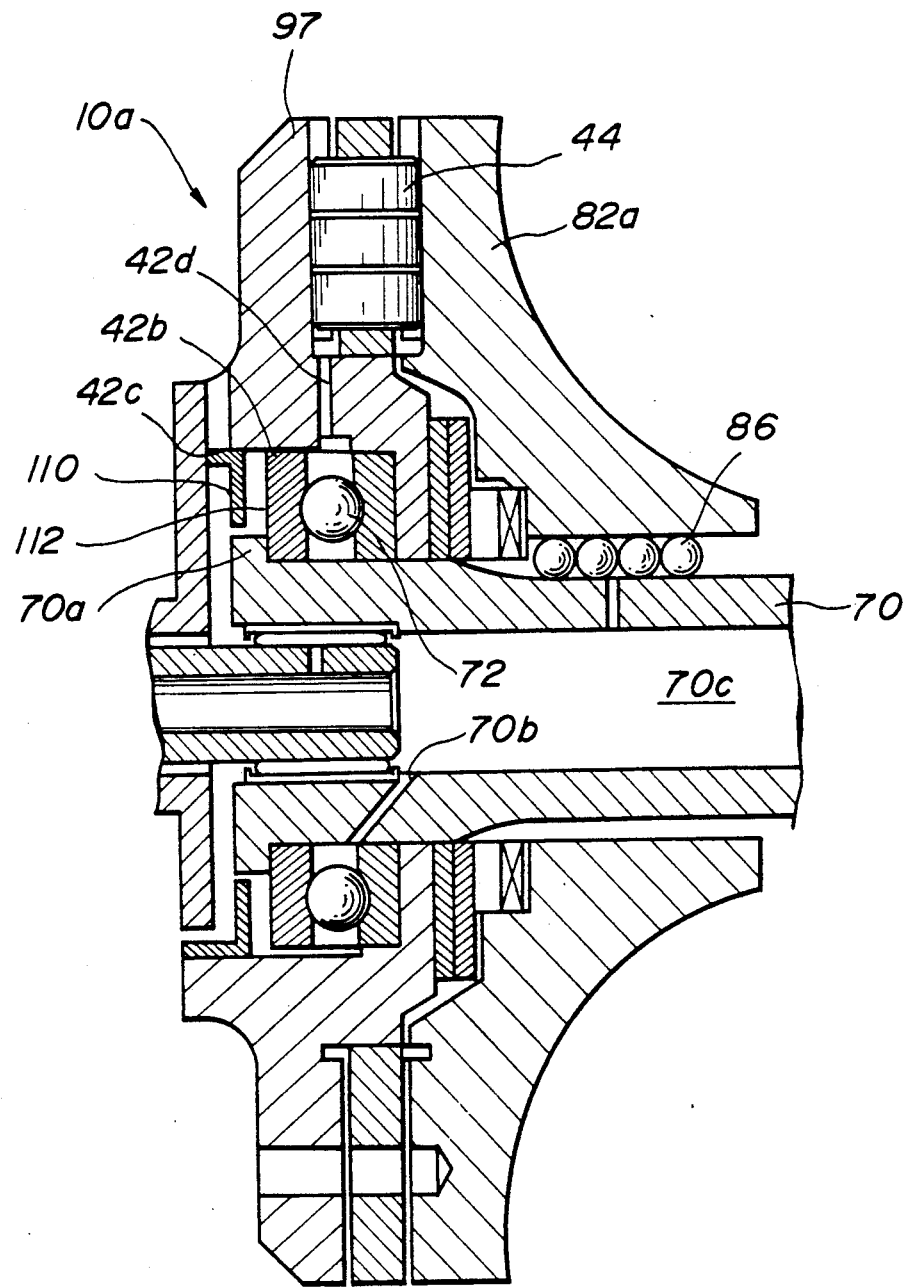
FIG. 2 is a sectional view showing a main portion of a toroidal type continuously variable transmission according to a second embodiment of the invention.
Figure 3:
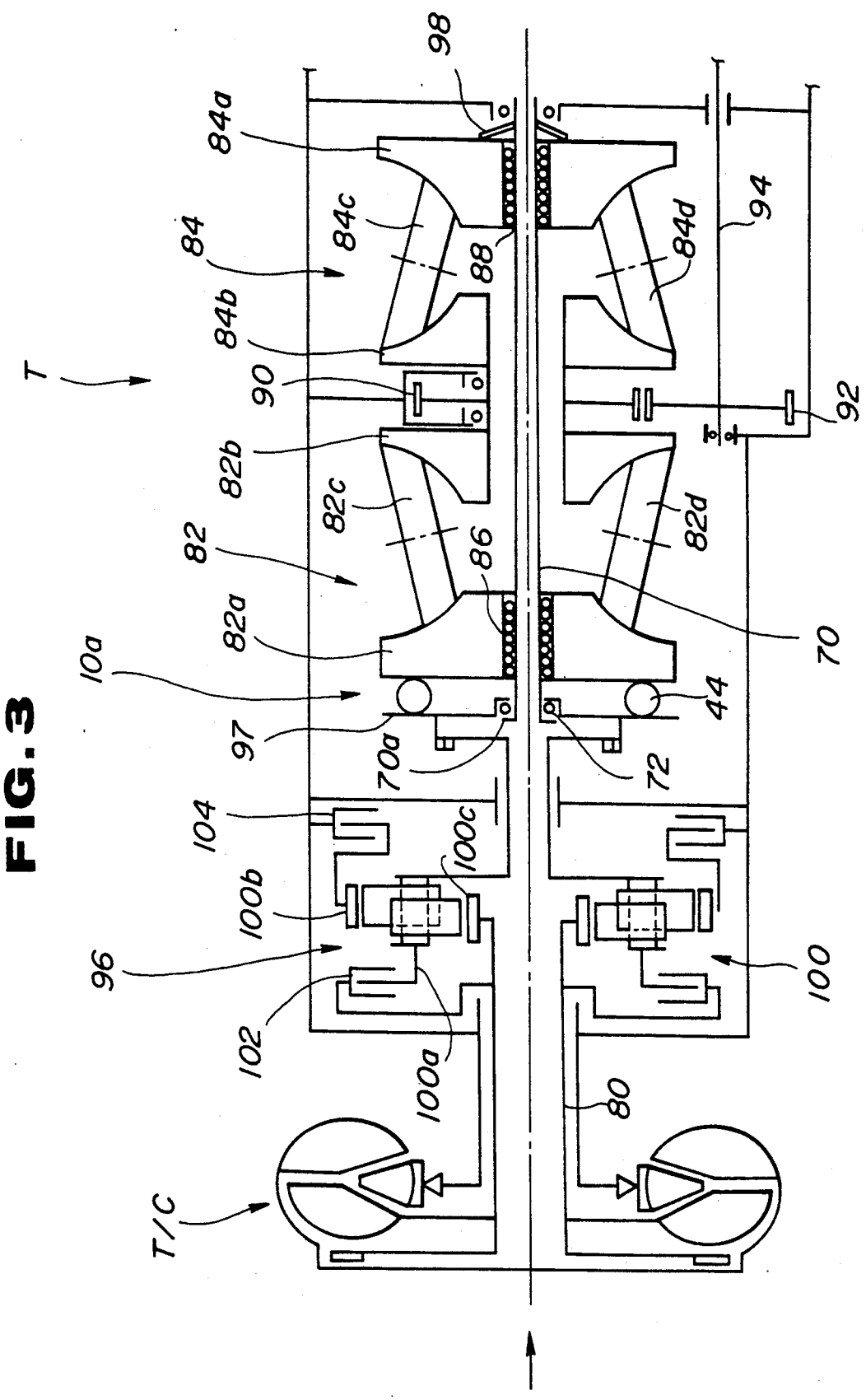
FIG. 3 is a schematic view showing the transmission of the second embodiment.

A second embodiment of the present invention is shown in FIGS. 2 and 3.

A loading cam mechanism 10a of the second embodiment has a thrust bearing 72 interposed between a drive plate 97 and a center transmission shaft 70, as shown in FIG. 2.

FIG. 3 is a schematic view of a transmission system of the second embodiment. This transmission system employs a toroidal type continuously variable transmission T of a double toroidal cavity type. The transmission T is connected with a torque converter T/C. An engine of a vehicle is provided on the left side of the torque converter T/C, and power of the o engine is inputted to the transmission T through the torque converter T/C.

The center transmission shaft 70 of the transmission T is in alignment with an output shaft 80 of the torque converter T/C. The transmission T includes first and second toroidal type drive units 82 and 84 which are both mounted on the center transmission shaft 70 side by side so as to provide two parallel equal drive paths.

The first unit 82 has a first input disc 82a, a first output disc 82b, and friction power rollers 82c and 82d disposed in a first toroidal cavity formed between the first input and output discs 82a and 82b. The second unit 84 includes a second input disc 84a, a second output disc 84b, and friction power rollers 84c and 84d disposed in a second toroidal cavity formed between the second input and output discs 84a and 84b.

The center transmission shaft 70 has a first end closer to the torque converter T/C, and a second end remoter from the torque converter T/C. The first drive unit 82 is mounted on a first half of the center transmission shaft 70 between the first end and middle of the center transmission shaft 70. The second drive unit 84 is mounted on a second half of the center transmission shaft 70 between the second end and middle. The first and second output disc 82b and 84b are disposed axially between the first and second input discs 82a and 84a. The first and second input disc 82a and 84a are coupled with the center transmission shaft 70, respectively, by first and second coupling means 86 and 88 in such a manner as to prevent relative rotation between the center transmission shaft 70 and each input disc 82a or 84a, and to permit smooth axial motion of each input disc 82a or 84a on the center transmission shaft 70. In this embodiment, the first and second coupling means 86 and 88 are ball splines including splines and balls.

The first and second output discs 82b and 84b are connected to an output gear 90, so that the output gear 90 receives both of a first torque transmitted from the first input disc 82a to the first output disc 82, and a second torque transmitted from the second input disc 84a to the second output disc 84b. The torque of the output gear 90 is further transmitted through a counter shaft 94 having a gear 92 meshing with the output gear 90, and a subsequent drive line, to drive wheels of the vehicle.

The transmission T of the second embodiment further includes the loading cam mechanism 10a provided on the left side of the first input disc 82a, as viewed in FIG. 3, and a forward-reverse changeover mechanism 96 provided between the torque converter T/C and the loading cam mechanism 10a. The output torque of the torque converter T/C is transmitted through the forward-reverse changeover mechanism 96, to the loading cam mechanism 10a.

The loading cam mechanism 10a of the second embodiment has the drive plate 97 which is rotatably mounted on the center transmission shaft 70. The center transmission shaft 70 has a first outward flange 70a formed at the first end. The thrust bearing 72 is provide between the first outward flange 70a of the center transmission shaft 70, and the drive plate 97. The first outward flange 70a limits the axial movement of the drive plate 97 relative to the center transmission shaft 70.

The transmission T further includes a disc spring (Belleville spring) 98 disposed between the second input disc 84a and the second end of the center transmission shaft 70, for producing an axial preload.

The forward-reverse changeover mechanism 96 of this embodiment has a planetary gear set 100 of a double planet type (or a double pinion type), a forward clutch 102, and a reverse brake 104. The planetary gear set 100 includes a planet carrier 100a, a ring gear 100b, a sun gear 100c, and first and second planet pinions. The sun gear 100c is connected with the torque converter output shaft 80 so as to receive a torque from the torque converter T/C, and the carrier 100a is connected with the loading cam mechanism 10a so as to deliver the torque to the loading cam mechanism 10a. The first pinion is in mesh with the ring gear 100b, and the second pinion is in mesh with the first pinion and the sun gear 100c. The forward clutch 102 is disposed between the torque converter output shaft 80 and the carrier 100a. and designed to connect and disconnect the carrier 100a with and from the converter output shaft 80. The reverse brake 104 is disposed between the ring gear 100b and a housing, and designed to hold and release the ring gear 100b. The rotation transmitted from the foward-reverse changeover mechanism 96 to the drive plate 97 of the loading cam mechanism 10a is in a foward rotational direction when the foward clutch 102 is engaged, and the reverse brake is released, and in a reverse rotational direction corresponding to a brackward movement of the vehicle when the foward clutch 102 is released, and the reverse brake 104 is engaged.

The loading cam mechanism 10a receives the input torque in the foward or reverse direction from the foward-reverse changeover mechanism 96, and varies an axial thrust load applied on the first input disc 82a in accordance with the input torque. The loading cam mechanism 10a further applies a reaction force of the thrust load on the first outward flange 80a of the center transmission shaft 70 through the thrust bearing 72, and accordingly, an axial thrust load is applied on the second input disc 84a through the disc spring 98 by the center transmission shaft 70 which is axially slidable to a limited extent.

During this, the thrust bearing 72 requires sufficient lubrication to permit smooth relative rotation between the drive plate 97 and the center transmission shaft 70 while withstanding the heaving axial thrust load.

In the second embodiment, therefore, a ring-shaped oil receiving member 110 is attached to the drive plate 97. The drive plate 97 has a hub portion which is formed with a cylindrical depression 42b receiving the thrust bearing 72. The depression 42b has an inner cylindrical surface which surrounds the first end of the center transmission shaft 70, and which axially extends from an open side 42c facing toward the torque converter T/C, to a closed side closed by a side wall having a hole receiving the center transmission shaft. The oil receiving member 110 is fixed to the inner cylindrical surface the depression 42b at and near the open end 42c substantially in a watertight manner. The oil receiving member 110 has an inward flange portion which extends radially inwardly toward the center transmission shaft 70, from the inner cylindrical surface of the depression 42b. In this way, an annular oil reservoir 112 is formed by the inward flange portion of the oil receiving member 110, the inner cylindrical surface of the depression 42b of the drive plate 97, and the side wall of the drive plate 97.

The center transmission shaft 70 is formed with at least one radial hole 70b, and an axial central bore 70c. The radial hole 70b extends radially from the central bore 70c to the outer surface of the center shaft 70, and serves to supply the lubricating oil from the central bore 70c to the thrust bearing 72. In this embodiment, the hole 70b extend obliquely.

In the second embodiment, the oil receiving member 110 serves as a dam for obstructing the oil flow, and confines the lubricating oil supplied to the thrust bearing 72 through the hole 70b, in the oil reservoir 112. Therefore, the thust bearing 72 is submerged in the lubricating oil stored in the oil reservoir 112, and protected against wear and seizure.

The drive plate 97 of the second embodiment is formed with a radial oil hole 42d extending from the oil reservoir 112 to the space in which the cam rollers 44 are confined. The lubricating oil in the oil reservoir 112 is supplied to the cam rollers 44 through the hole 42d.

In the second embodiment, the thrust bearing 72 serves as the thrust supporting means for sustaining a thrust load, and as the thrust roller means compressed between the first and second rotating means. The oil receiving member 110 serves as the lubricant receiving means. The first rotating means is constituted by the drive plate 97, and the second rotating means is constituted by the first input disc 82a and the center transmission shaft 70 having the outward flange 70a.

Figure 4:
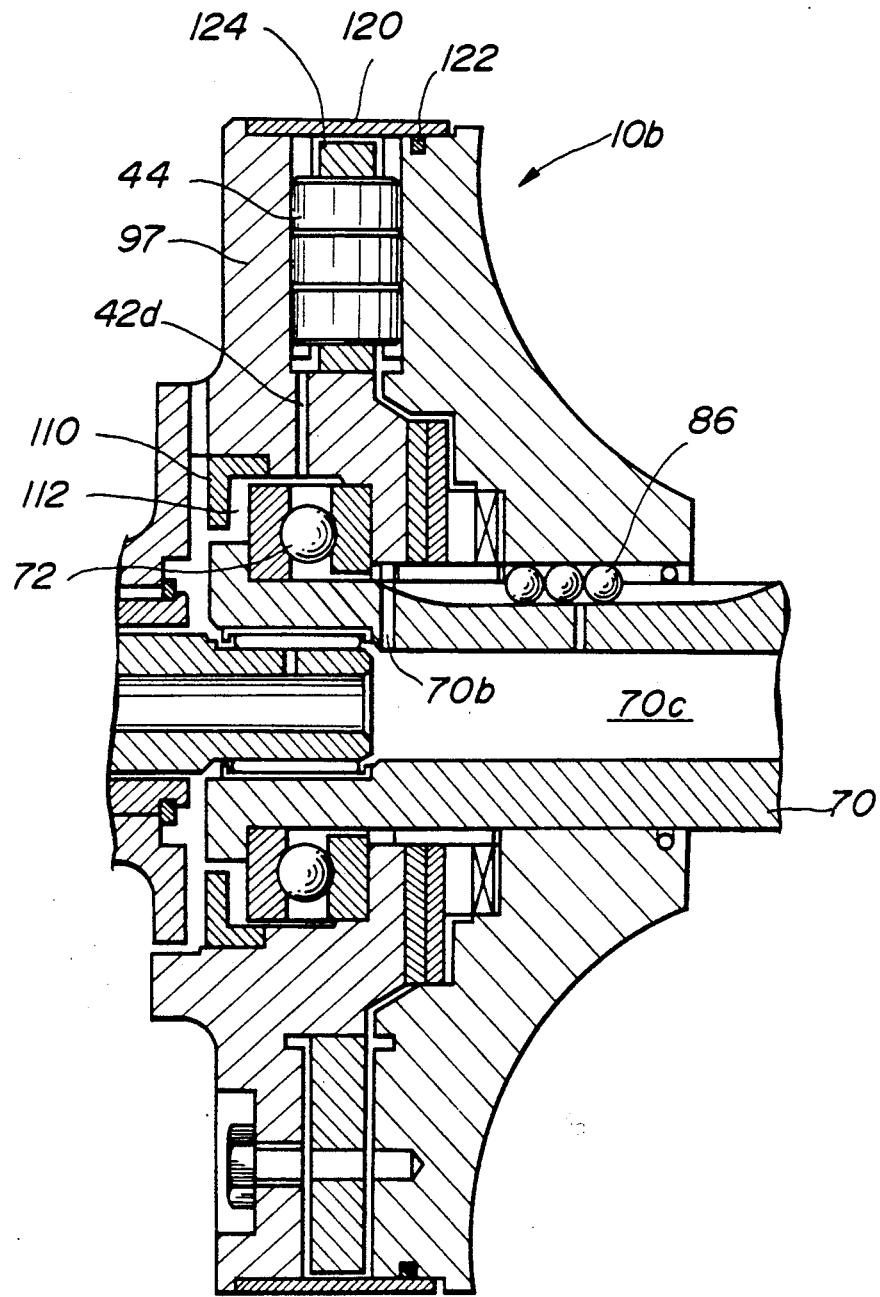
FIG. 4 is a sectional view showing a main portion of a toroidal type continuously variable transmission according to a third embodiment of the invention.

A third embodiment of the present invention is shown in FIG. 4.

A loading cam mechanism 10b of the third embodiment is almost the same as the loading cam mechanism 10a of the second embodiment, and incorporated in a toroidal type CVT system identical to the CVT system shown in FIG. 3. However, the loading cam mechanism 10b of the third embodiment has two oil receiving members 110 and 120. The first receiving member 110 is similar to the receiving member 110 of the second embodiment, and designed to help lubrication of the thrust bearing 72 between the drive plate 97 and the first outward flange 70a of the center transmission shaft 70. The second receiving member 120 is intended to ensure the sufficient lubrication of the cam rollers 44.

The second receiving member 120 is cylindrical and has axially spaced first and second ends. The first end of the receiving member 120 is fixed to an outer periphery of the drive plate 97 substantially in a watertight manner. The second end of the receiving member 120 is fitted over the outer periphery of the first input disc 82a with the interposition of a seal ring 122 retained in an annular groove of the first input disc 82a.

In the third embodiment, the first oil receiving member 110 forms a first annular oil reservoir 112 for flooding the thrust bearing 72 with the lubricating oil, and the second oil receiving member 120 forms a second annular oil reservoir 124 for flooding the cam rollers 44.

The present invention is applicable to toroidal type CVTs of various types. For example, it is possible to employ a toroidal type CVT having three or more toroidal cavities.

What is claimed is:

1. A toroidal type continuously variable transmission, comprising;
   a center shaft,
   a drive means comprising input and output discs mounted on said center shaft, and a friction roller means interposed between said input and output discs for transmitting torque therebetween, and
   a loading means for applying an axial thrust load to said drive means in accordance with an input torque inputted to said drive means, said loading means comprising a thrust supporting means for sustaining a thrust load, and a lubricant receiving means for forming a reservoir for storing a lubricant so as to immerse said thrust supporting means in the lubricant stored in said reservoir.

2. A transmission according to claim 1 wherein said thrust supporting means comprises a thrust roller means, compressed between a first rotating means rotating about a center axis of said center shaft, and a second rotating means rotating about said center axis, for sustaining a thrust load and permitting a relative rotation between said first and second rotating means, and said reservoir has an annular shape surrounding said center shaft.

3. A transmission according to claim 1 wherein said loading means comprises a loading cam mechanism comprising a drive plate mounted on said center shaft, said drive plate and said input disc being rotatable relative to each other, and wherein said thrust supporting means comprises a thrust roller means, compressed between a first rotating means which rotates as a unit about a center axis of said center shaft and which comprises said drive plate, and a second rotating means which rotates as a unit about said center axis of said center shaft and which comprises said input disc, for sustaining a thrust load acting between said first and second rotating means and permitting said first and second rotating means to rotate relative to each other.

4. A transmission according to claim 3 wherein said reservoir formed by said receiving means has an annular shape surrounding said center shaft and collecting the lubricant discharged radially outwardly from a hole of said center shaft.

5. A transmission according to claim 4 wherein said center shaft has an axial center bore and at least one radial hole for discharging the lubricant radially outwardly from said center bore.

6. A transmission according to claim 4 wherein one of said drive plate and said input disc is mounted on said center shaft so as to prevent a rotation relative to said center shaft, and the other of said drive plate and said input disc is mounted on said center shaft so as to permit a rotation relative to said center shaft.

7. A transmission according to claim 4 wherein said thrust supporting means comprises cam rollers compressed between said drive plate and said input disc, and said receiving means comprises a receiving member surrounding an interspace between said drive plate and said input disc.

8. A transmission according to claim 7 wherein said receiving member is fixed to one of said drive plate and said input disc.

9. A transmission according to claim 8 wherein said receiving member has a circumferential portion surrounding said interspace, and an inward flange portion, said circumferential portion having first and second ends and axially extending from said first end to said second end, said first end of said circumferential portion being fixedly mounted on said input disc, said inward flange portion extending radially inwardly toward said center shaft from said second end of said circumferential portion, said drive plate being located axially between said inward flange portion and said input disc.

10. A transmission according to claim 8 wherein said receiving member has a circumferential portion which surround said interspace between said drive plate and said input disc, and which has a first end fixedly mounted on said drive plate, and a second end abutting on a seal ring mounted on said input disc.

11. A transmission according to claim 8 wherein said receiving member is fixed to one of said drive plate and input disc in a liquid-tight manner.

12. A transmission according to claim 8 wherein said drive plate is mounted on said center shaft so as to prevent a relative rotation between said drive plate and said center shaft, and said input disc is mounted on said center shaft so as to permit a relative rotation between said input disc and said center shaft.

13. A transmission according to claim 8 wherein said drive plate is mounted on said center shaft so as to permit a relative rotation between said drive plate and said center shaft, and said input disc is mounted on said center shaft so as to prevent a relative rotation between said input disc and said center shaft.

14. A transmission according to claim 13 wherein said thrust supporting means comprises a thrust bearing disposed between said drive plate and said center shaft, and said receiving means comprises another receiving member for said thrust bearing, said receiving member for said thrust bearing forming another reservoir for storing the lubricant so as to immerse said thrust bearing in the lubricant stored in said reservoir for said thrust bearing.

15. A transmission according to claim 4 wherein said thrust supporting means comprises a thrust bearing disposed between said drive plate and said center shaft, and said receiving means comprises a receiving member for forming said reservoir for storing the lubricant so as to immerse said thrust bearing in the lubricant stored in said reservoir.

16. A transmission according to claim 15 wherein said receiving member is fixed to said drive plate.

17. A transmission according to claim 16 wherein said drive plate has an inwardly facing cylindrical surface surrounding said thrust bearing and having first and second ends which are axially spaced from each other, and a flat side wall portion extending radially inwardly from said first end of said inwardly facing cylindrical surface and having a hole receiving said center shaft, and said receiving member is shaped like a ring, and fixed to said inwardly facing cylindrical surface of said drive plate, and has an inward flange portion extending radially inwardly from said inwardly facing cylindrical surface of said drive plate so as to form said reservoir of an annular shape with said inwardly facing cylindrical surface and said flat side wall of said drive plate.

* * * * *